(12) United States Patent
Chamberlain

(10) Patent No.: US 7,216,882 B2
(45) Date of Patent: May 15, 2007

(54) SHOCK ABSORBER MOUNTING ASSEMBLY FOR A BICYCLE

(75) Inventor: Jason L. Chamberlain, Morgan Hill, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 37 days.

(21) Appl. No.: 11/169,340

(22) Filed: Jun. 29, 2005

(65) Prior Publication Data

US 2007/0001424 A1 Jan. 4, 2007

(51) Int. Cl.
B62K 25/20 (2006.01)
(52) U.S. Cl. .................................. 280/283; 180/227
(58) Field of Classification Search .............. 280/283, 280/284, 285, 286, 281.1; 180/227
See application file for complete search history.

(56) References Cited

U.S. PATENT DOCUMENTS

| | | | |
|---|---|---|---|
| 3,165,339 A | 1/1965 | Faccou | |
| 3,233,921 A | 2/1966 | Holmgren et al. | |
| 3,761,147 A | 9/1973 | Watt | |
| 4,647,084 A | 3/1987 | Hagin et al. | |
| 5,496,052 A | 3/1996 | Tamaishi | |
| 5,531,289 A | 7/1996 | Muramatsu | |
| 5,592,999 A | 1/1997 | Matsuura et al. | |
| 5,628,524 A | 5/1997 | Klassen et al. | |
| 5,743,284 A | 4/1998 | Lumpkin | |
| 5,952,752 A | 9/1999 | Kim | |
| 6,024,492 A | 2/2000 | Woo et al. | |
| 6,170,845 B1 * | 1/2001 | Tseng | 280/284 |
| 6,189,638 B1 | 2/2001 | Ito et al. | |
| 6,361,059 B1 | 3/2002 | Ellsworth | |
| 6,691,814 B2 * | 2/2004 | Toyoda | 180/227 |
| 6,877,591 B1 * | 4/2005 | Hso | 188/321.11 |
| 6,913,101 B2 * | 7/2005 | Uneta et al. | 180/227 |
| 7,011,174 B1 * | 3/2006 | James | 180/227 |
| 2004/0061305 A1 | 4/2004 | Christini | |
| 2004/0130123 A1 | 7/2004 | Uneta et al. | |

* cited by examiner

*Primary Examiner*—Tony Winner
(74) *Attorney, Agent, or Firm*—Knobbe, Martens, Olson & Bear, LLP

(57) ABSTRACT

A system and method for mounting a shock absorber to a bicycle frame. The system preferably includes at least one spacer having a first spacer member and a second spacer member. Each of the first and second spacer members include a curved contact surface configured to contact the respective surface of the other spacer member. A first one of the spacer members is located relative to the bicycle frame and the second one of the space members is located relative to the shock absorber. The shock absorber and the second one of the spacer members may be rotated relative to the first spacer member and the bicycle frame to achieve a desired alignment between the shock absorber and the bicycle frame to compensate for misalignment between the mounting structures on the bicycle frame for a respective first and second ends of the shock absorber.

20 Claims, 3 Drawing Sheets

SHOCK ABSORBER MOUNTING ASSEMBLY FOR A BICYCLE

BACKGROUND OF THE INVENTION

1. Field of the Invention

The present invention is related to shock absorber mounting assemblies in general and, more specifically, to a shock absorber mounting assembly well-suited for use in securing at least one end of a shock absorber to a bicycle.

2. Description of the Related Art

Many bicycles, especially those intended for off-road use, incorporate a suspension assembly associated with one or both of the front and rear wheels. In one common arrangement of a bicycle incorporating a rear wheel suspension assembly, the bicycle frame includes a main frame portion and a sub-frame portion, which is moveable relative to a main frame. The rear wheel is carried by the sub-frame and a rear shock absorber is connected at a first end to the main frame and at a second end to the sub-frame. The shock absorber is configured to provide a force tending to attenuate force inputs applied to the rear wheel of the bicycle and passed on to the main frame and, thus, the rider of the bicycle.

Typically, each end of the shock absorber includes a mounting eyelet. Each mounting eyelet commonly defines a mounting aperture. The main frame and sub-frame typically each include a mounting aperture that corresponds to the respective mounting apertures of the first and second ends of the shock absorber. A support shaft, such as a bolt, is typically passed through the mounting aperture of the main frame and the mounting aperture of the first end of the shock absorber. Another support shaft is passed through the mounting aperture of the sub-frame and the mounting aperture of the second end of the shock absorber. Accordingly, the shock absorber is operably connected between the main frame and sub-frame of the bicycle.

A common shock absorber includes two portions which are telescopically engaged for movement relative to one another along a longitudinal axis of the shock absorber. Due to variations and imperfections inherent in many manufacturing processes, the axes of the mounting apertures of the main frame and the sub-frame often will not be perfectly aligned with one another. That is, the mounting apertures of the main frame and sub-frame are often not perfectly parallel to one another. When the shock absorber is mounted to a bicycle frame having such misaligned mounting apertures, the moveable portions of the shock absorber tend to align with their respective support shaft, or bolt, and thus are misaligned with one another. As a result, the forces applied to the shock absorber by the sub-frame and main frame may not be perfectly aligned with the longitudinal axis of the shock absorber and, therefore, a force component is applied to the shock absorber in a direction perpendicular to its longitudinal axis. This condition is referred to as "side loading" of the shock absorber. Side loading of the shock absorber causes wear and often premature failure of certain components of the shock absorber, such as various seal members, for example.

SUMMARY OF THE INVENTION

Preferred embodiments of the present shock absorber mounting assembly address the side loading situation that occurs often due to misalignment of shock mount structures between the main frame and sub-frame of a vehicle, such as a bicycle, motorcycle, automobile, for example, but without limitation. The preferred embodiments provide a mechanism for compensating for misalignments between the mounting apertures of the main frame and sub-frame, at least within the realm of normal manufacturing variations. Preferably, the shock absorber mounting assembly incorporates one or more spacers having a first portion and a second portion. The first and second portions preferably include corresponding curved surfaces which contact one another when a shock absorber is mounted to a bicycle frame with the shock absorber mounting assembly. Desirably, a first portion of the spacer is positioned relative to the shock absorber support shaft and the second portion of the spacer is positioned relative to the shock absorber. The circular contact surfaces permit the first and second portion of the spacer to be adjustable relative to one another to compensate for misalignment between the support shaft and the shock absorber. In certain arrangements, the curved surfaces of the first and second portions of the spacer are spherical in shape. Furthermore, in certain arrangements, the shock absorber mounting assembly is configured to be mounted between the shock absorber and the sub-frame of a bicycle.

A preferred embodiment is a bicycle having a frame assembly. The frame assembly includes a first portion and a second portion movable relative to one another. A shock absorber has a first end configured to be secured to the first portion of the frame assembly. The shock absorber also has a second end. A support shaft defines a shaft axis and is supported by and substantially fixed relative to the second portion of the frame assembly. The support shaft is sized and shaped to be received by a mounting aperture in the second end of the shock absorber. The bicycle also includes a first spacer and a second spacer. The first spacer extends along the support shaft between a first side of the shock absorber and the bicycle frame and the second spacer extends along the support shaft between a second side of the shock absorber and the bicycle frame. Each of the first and second spacers has a first portion and a second portion. The first portions have a first curved surface and the second portions have a second curved surface complementary to and configured to contact the respective first curved surfaces. The first portion of each spacer is configured to be located relative to the shock absorber and the second portion of each spacer is configured to be located relative to the support shaft. The first and second portions are movable relative to one another along the first and second contact surfaces to permit adjustment of the first and second spacers to compensate for misalignment between the longitudinal axis of the shock absorber and the shaft axis.

A preferred embodiment is an apparatus for mounting a shock absorber to a portion of a bicycle frame. The apparatus includes a support shaft defining a shaft axis. The support shaft is sized and shaped to extend through a first aperture in a mounting eyelet of the shock absorber and through a second aperture in the bicycle frame. The apparatus also includes at least one spacer extending along the support shaft between the mounting eyelet and the bicycle frame. The at least one spacer has a first portion and a second portion, wherein the first portion has a first curved surface and the second portion has a second curved surface complementary to and configured to contact the first curved surface. The first portion is configured to be located relative to the mounting eyelet and the second portion is configured to be located relative to the support shaft. The first and second portions are movable relative to one another along the first and second contact surfaces to permit adjustment of the at least one spacer to compensate for misalignment between an axis of the shock absorber and the shaft axis.

A preferred embodiment is a method for reducing side loads on a shock absorber mounted between movable portions of a bicycle frame. The method includes securing a first end of a shock absorber to a first portion of the bicycle frame and passing a support shaft, defining a shaft axis, through a mounting aperture in a second portion of the bicycle frame. The support shaft is also passed through a mounting eyelet on a second end of the shock absorber. The support shaft is supported relative to the second portion of the bicycle frame. A first portion of a spacer is located relative to the shock absorber. A second portion of the spacer is located relative to the support shaft such that the first and second portions contact one another along respective curved contact surfaces. The first and second portions of the spacer are secured in a position relative to one another to accommodate misalignment of the shaft axis and the shock axis.

BRIEF DESCRIPTION OF THE DRAWINGS

These and other features, aspects and advantages of the present invention are described below with reference to drawings of a preferred embodiment, which is intended to illustrate, but not to limit, the present invention. The drawings contain three figures.

In FIG. 2, the shock absorber and portion of the sub-frame have been removed from the remainder of the bicycle for clarity.

DETAILED DESCRIPTION OF THE PREFERRED EMBODIMENT

Figure 1:
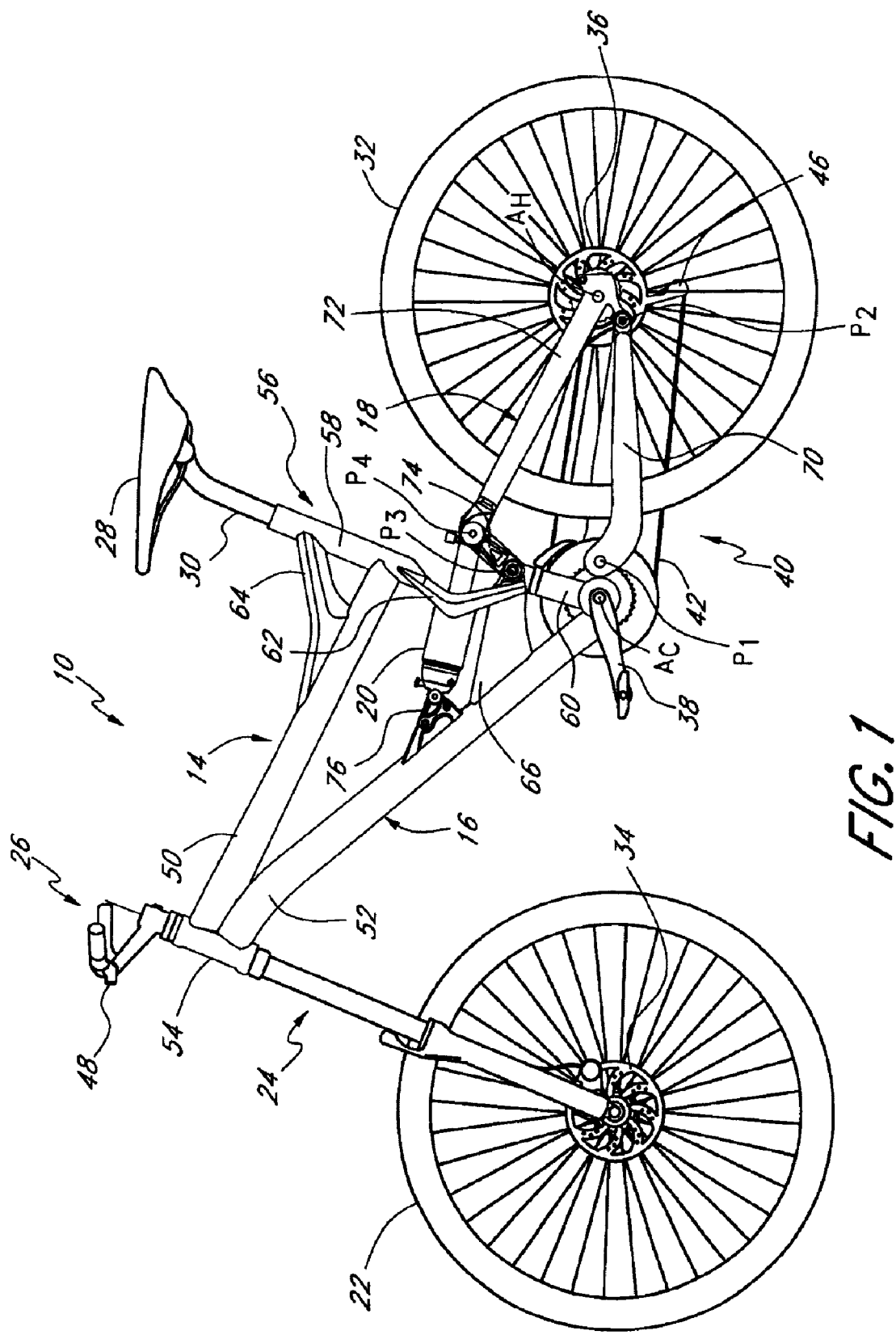
FIG. 1 is a side, elevation view of a bicycle incorporating a shock absorber mounting assembly having certain features, aspects and advantages of the present invention. The bicycle in FIG. 1 includes a frame assembly having a main frame portion and a sub-frame portion. A shock absorber is operably connected between the main frame portion and the sub-frame portion of the bicycle frame assembly.

FIG. 1 illustrates a bicycle 10 including a shock absorber mounting assembly having certain features, aspects and advantages of preferred embodiments of the present invention. The overall bicycle 10 is described in general detail to assist in the understanding of certain beneficial features and advantages of the illustrated embodiment of the shock absorber mounting assembly 12. Details of the bicycle 10 that are not described herein may be assumed to be of a conventional construction or a suitable alternative construction, as will be appreciated by one of skill in the art. Although the present shock absorber mounting assembly is described herein with respect to a bicycle application, it is contemplated that the mounting assembly may be adapted for use with other vehicles incorporating shock absorbers, such as motorcycles or automobiles, for example.

The bicycle 10 includes a frame assembly 14 which, preferably, includes a main frame portion 16 and a sub-frame portion 18. The sub-frame 18 is moveable relative to the main frame 16. Movement of the sub-frame 18 relative to the main frame 16 is influenced by a shock absorber 20, which is operably connected between the main frame 16 and the sub-frame 18.

A front wheel 22 of the bicycle is supported relative to the frame 14 by a front suspension assembly 24 which, in the illustrated arrangement, is a front suspension fork. The suspension fork 24 is rotatably supported by a forward end of the frame assembly 14 so that the front wheel 22 may be rotated about a steering axis. A handlebar assembly 26 is coupled to an upper end of the front suspension fork 24 to permit a rider of the bicycle 10 to steer the front wheel 22.

A seat 28 is supported on a seat post 30, which extends in an upward direction from an intermediate portion of the frame assembly 14. The seat post 30 is adjustable relative to the frame assembly 14 to permit adjustment of a height of the seat 28.

A rear wheel 32 is rotatably supported by the sub-frame 18. Thus, the rear wheel 32 is moveable relative to the main frame 16 along with the sub-frame 18. Accordingly, impacts imparted to the rear wheel 32 desirably are at least somewhat attenuated before reaching a rider of the bicycle 10.

The front and rear wheels 22, 32 include front and rear brakes 34, 36, respectively. The brakes 34, 36 are configured to selectively apply a force tending to slow or stop rotation of the front or rear wheel 22, 32. The illustrated brakes 34, 36 are disc brakes, including a circular brake rotor and a caliper. However, other suitable types of brake systems may also be used, such as cantilever brakes which apply a squeezing force to a rim of the wheel 22 or 32, for example.

In the illustrated arrangement, the rear wheel 32 is driven by a pedal crank assembly 38 through a chain and sprocket-drive arrangement 40. The pedal crank assembly 38 is rotatably support by the frame assembly 14 and supports a plurality of different sized gears, or chain rings, for rotation along with the pedal crank 38. A plurality of different sized gears, or cogs (not shown), are supported on a central hub of the rear wheel 36. A drive chain 42 interconnects a selected one of the chain rings with a selected one of the cogs such that the rear wheel 32 may be rotated along with forward rotation of the pedal crank 38.

The drive chain 42 may be moved into engagement with a selected one of the chain rings and cogs by front and rear derailleurs 44, 46 respectively. Although a multi-speed, chain drive arrangement 40 is preferred, other suitable types of drive train arrangements may also be used. Desirably, operator controls 48 are provided on one or both sides of the handlebar assembly 26 to permit a rider of the bicycle 10 to control the front and rear brakes 34, 36 and front and rear derailleurs 44, 46.

As described above, the frame assembly 14 includes a main frame portion 16 and a sub-frame portion 18. Preferably, the sub-frame 18 is moveable relative to the main frame 16. In one arrangement, each of the main frame 16 and sub-frame 18 are constructed as an assembly of individual pieces. Generally, the main frame 16 and sub-frame 18 will be constructed from individual, metal tubular members that are welded together. However, other suitable materials and manufacturing processes may also be used. For example, in some arrangements, all or part of the main frame 16 or sub-frame 18 may be a one piece, composite structure, for example. In addition, a combination of different materials may be used to construct one or both of the main frame 16 and sub-frame 18, such as a combination of a metal material (e.g., aluminum, steel, titanium) and a composite material (e.g., carbon fiber).

In the illustrated arrangement, the main frame 16 includes a top tube 50 and a down tube 52 which extend between a forward end and a rearward end of the main frame 16. Preferably, forward ends of the top tube 50 and down tube 52 are joined to a head tube 54, which rotatably supports the suspension fork 24. Desirably, the top tube 50 and down tube 52 also contact one another along a distance rearward of the head tube 54 to create an advantageously high strength junction.

A seat tube 56 extends in a generally vertical direction at or near a rearward end of the main frame 16 and, preferably, is connected to rearward ends of the top tube 50 and down tube 52. In the illustrated arrangement, the seat tube is of an interrupted construction and includes an upper seat tube portion 58 and a lower seat tube portion 60. Preferably, the upper seat tube portion 58 supports the seat 28 and seat post 30. The lower seat tube portion 60 preferably supports at least a portion of the sub-frame 18. In the illustrated arrangement, the upper and lower portions 58, 60 of the seat tube 56 are connected by a seat tube support stay 62, which passes along one side of the shock absorber 20. Preferably, another seat tube support stay 62 is provided on an opposite side of the seat tube 56 such that the pair of seat tube support stays 62 straddle the rear shock absorber 20. Desirably, at a junction between the down tube 52 and the lower portion 60 of the seat tube 56 is a bottom bracket shell (not shown), which supports the pedal crank assembly 38.

The main frame 16 may also include one or more additional structural members. For example, the main frame 16 includes a gusset 64 which extends between an upper surface of the top tube 50 and a forward surface of the upper portion 58 of the seat tube 56. Desirably, the gusset 64 reinforces an upper end of the upper portion 58 of the seat tube 56. The main frame 16 also includes another gusset 66, which extends between an upper surface of the down tube 52 and an upper end of the lower portion 60 of the seat tube 56. Advantageously, the gusset 66 provides additional support to an upper end of the lower portion 60 of the seat tube 56 against forces applied to the main frame 16 by the sub-frame 18.

As described above, the sub-frame 18 preferably is moveable relative to the main frame 16 and carries the rear wheel 32. In the illustrated arrangement, the sub-frame 18 is a multiple linkage assembly comprising multiple linkage members, two or more of which are pivotally coupled to one another. Such an arrangement advantageously permits a path of movement of the rear wheel 32 to be altered from the simple, arcuate movement which would occur with a single pivot arm rear suspension assembly.

The illustrated sub-frame 18 includes at least one and, preferably, a pair of chain stays 70, which are pivotally coupled to the main frame 16 for rotation about a pivot axis $P_1$. That is, preferably, a pair of chain stays 70 preferably extend along each side of the rear wheel 32. The chain stays 70 may be interconnected, if desired. Alternatively, a single chain stay 70 may be provided on only one side of the rear wheel 32.

Figure 3:
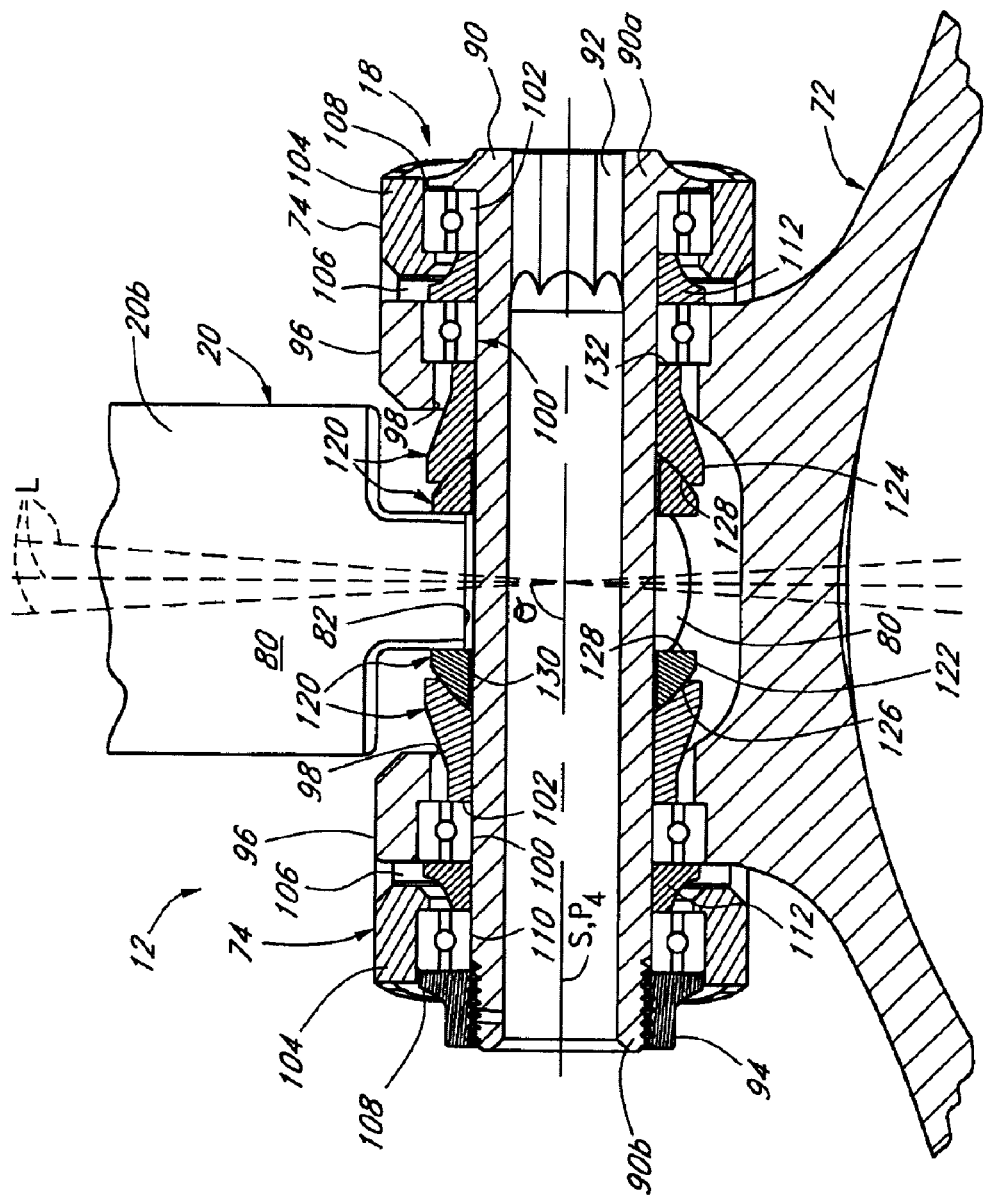
FIG. 3 is a cross-sectional view of the shock absorber mounting assembly and portions of the bicycle frame and shock absorber taken along the line 3—3 of FIG. 2.

The sub-frame 18 preferably also includes at least one and, preferably, a pair of seat stays 72. The seat stays 72 are coupled to rearward end portions of the chain stays 70 for rotation about a pivot axis $P_2$ relative to the chain stays 70. Preferably, the rear wheel 32 is carried by the seat stays 72 for rotation about a hub axis $A_H$. However, in other arrangements, the rear wheel 32 may be supported by the chain stays 70 or another member of the sub-frame 18 linkage. As with the chain stays 70, the seat stays 72 preferably are interconnected at an upper or forward end, as shown in FIG. 3. Alternatively, a single seat stay 72 may be provided.

Preferably, a lever structure, or link 74, interconnects an upper or forward end of the seat stays 72 with the main frame 16. The link 74 is also coupled to the main frame 16 and, preferably, to an upper end portion of the lower portion 60 of the seat tube 56, for rotation about a pivot axis $P_3$. In addition, the link 74 is configured for rotation relative to the seat stays 72 about a pivot axis $P_4$. Desirably, the link 74 includes a pair of spaced arm portions, which may be interconnected, as is shown in FIG. 3 and described below.

As will be appreciated by one of skill in the art, the relative lengths of the individual members of the sub-frame 18 and the relative positions of the pivot axes $P_1$–$P_4$ may be altered to achieve desired properties of the rear suspension assembly. In the illustrated arrangement, the pivot axis $P_1$ is positioned near, and preferably slightly above, the crank axis $A_c$. However, other positions of the pivot axis $P_1$ are also possible. Furthermore, preferably the pivot axis $P_2$ is positioned below the hub axis $A_h$. However, in other arrangements, the pivot axis $P_2$ may be aligned with or above the hub axis $A_h$. Furthermore, although the pivot axes $P_1$–$P_4$ described herein are illustrated as rotational connections between two or more members, it is also contemplated that a single member configured to flex at a specific location or region on the member may be utilized as well.

As described above, the shock absorber 20 preferably is operably connected between the main frame 16 and the sub-frame 18. In the illustrated arrangement, a rearward end of the shock absorber 20 is coupled to the sub-frame at the pivot axis $P_4$. Thus, the shock absorber 20, link 74 and seat stays 72 are all coupled at the pivot axis $P_4$. However, in other arrangements, the shock absorber 20 may be connected to another portion of the link 74, such as an intermediate portion or extension of the link 74 or other suitable element of the sub-frame 18. A forward end of the shock absorber 20 preferably is coupled to the main frame 16 by a shock support bracket 76 for rotation about a pivot axis $P_5$. Preferably, the pivot axis $P_5$ is spaced slightly above the pivot axis $P_4$ so that the shock absorber 20 is relatively higher at a forward end than at a rearward end.

Figure 2:
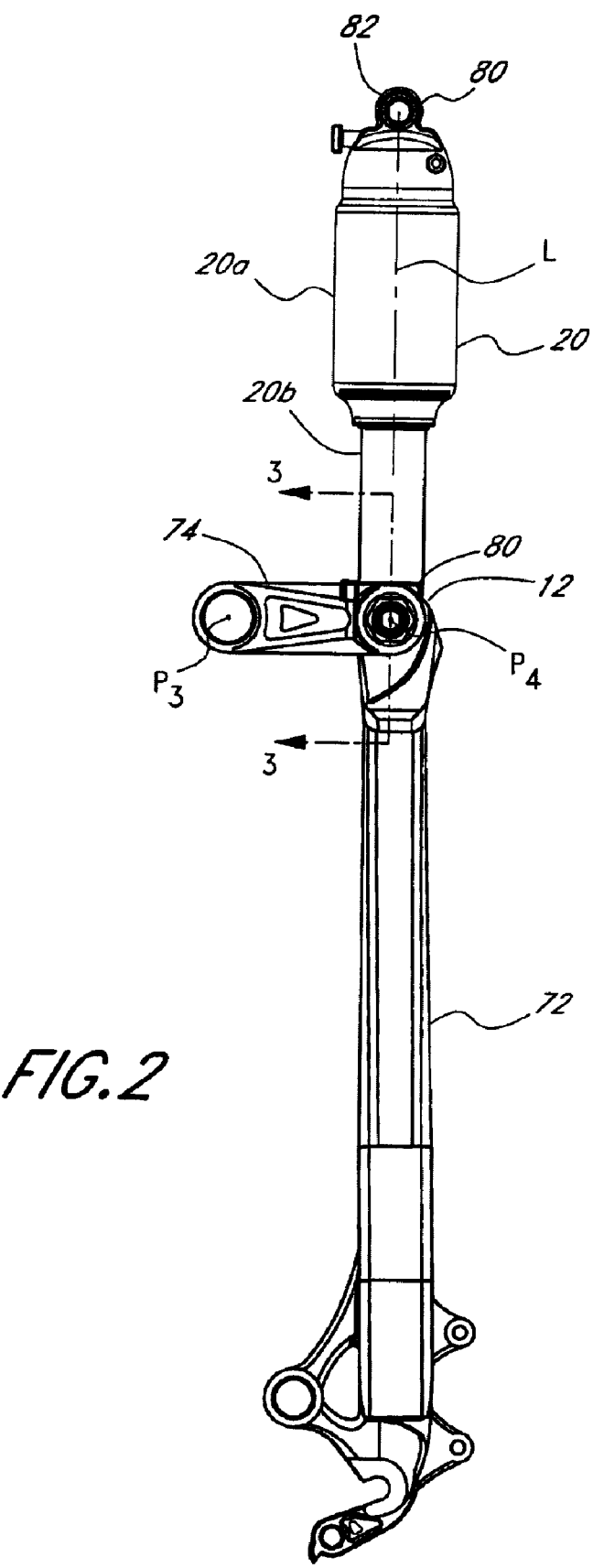
FIG. 2 is a side, elevation view of the shock absorber and a portion of the sub-frame of the frame assembly of the bicycle of FIG. 1.

With additional reference to FIGS. 2 and 3, preferably the shock absorber 20 includes a mounting eyelet 80 at each end (the mounting eyelet 80 of the rearward end of the shock absorber 20 is shown in FIG. 3). Each eyelet 80 preferably defines an aperture 82 through which a mounting structure, such as a support shaft, may be passed to support the shock absorber 20. The shock absorber 20 defines a longitudinal axis L between the centers of the apertures 82. Although the illustrated construction is typical for a bicycle shock absorber, other suitable types of mounting arrangements may be provided and the shock mounting arrangement 12 may be modified accordingly, as will be apparent to one of skill in the art in light of the present disclosure.

As will be appreciated by one of skill in the art, the shock absorber 20 preferably is configured to provide both a spring force and a damping force. The shock absorber 20 includes a first portion 20a and a second portion 20b that are in telescopic engagement with one another. Thus, a distance between the centers of the mounting apertures 82 varies throughout the range of travel of the shock absorber 20. The illustrated shock absorber 20 includes both an air spring and damper arrangements (not shown), which may be of a suitable construction apparent to one of skill in the art. In other arrangements, other types of suitable spring and/or damper arrangements may be used.

With reference to FIG. 3, the portion 20b of the shock absorber 20 is coupled to the sub-frame 18, as described above. Preferably, a support member, such as a bolt 90, interconnects the chain stays 72, link 74, and shock absorber 20. Desirably, the bolt 90 extends through each of the seat stays 72, link 74, and shock absorber 20. The illustrated bolt 90 also includes a head portion 90a which defines a tool cavity 92. The tool cavity 92 permits the bolt 90 to be held or rotated by a suitably shaped tool, such as a hex wrench in the illustrated arrangement. A preferably elongate, cylindrical shaft portion of the bolt 90 extends from the head portion 90a and terminates at an end portion 90b. Desirably, the end portion 90b includes external threads configured to mate with internal threads of a nut 94 such that the bolt 90 may receive the nut 94 to secure the bolt 90 in place. Preferably, the bolt 90 is hollow to reduce weight. However, if desired for strength or other reasons, a solid bolt may be utilized. Furthermore, although a bolt is preferred for its ease of use, other suitable components may be used to provide the desired support shaft for the shock absorber 20 and sub-frame 18. In addition, mounting arrangements other than a mounting shaft may be used.

Preferably, as described above, the seat stays 72 are interconnected at end portions opposite the hub axis $A_h$. The illustrated seat stays 72 include a pair of spaced apart mounting bosses 96. Each boss 96 defines a mounting aperture 98, which defines an axis that is generally aligned with a shaft axis S of the bolt 90 in an assembled state. Preferably, the chain stays 72 are supported for rotation relative to the bolt 90 by a bearing 100. The bearing 100, in the illustrated arrangement, is a ball bearing assembly including an inner race and an outer race separated by a plurality of spherical ball bearing members. However, in other arrangements, other types of suitable bearings may be used, such as roller bearings or solid bearings (bushings), for example. The bearing assembly 100 preferably also includes seals 102 configured to inhibit foreign matter from entering between the races of the bearing 100. The seals 102 are shown schematically for one of the bearings 100. However, the other bearings disclosed herein in connection with the shock absorber mounting assembly 12 preferably are of a similar construction unless otherwise noted. Advantageously, with the illustrated construction, relatively large bearings 100 may be utilized, which provide improved performance and increased life relative to smaller bearings or bushings. In one arrangement, the bearings 100 have an inside diameter of about 15 millimeters. Accordingly, the outside diameter of the shaft portion of the bolt 90 preferably is also about 15 millimeters.

As described above, the link 74 preferably includes spaced apart arm portions 104 interconnected by an intermediate bridge portion 106, a portion of which is shown in FIG. 3. Preferably, the link 74 is also supported for rotation relative to the bolt 90 and includes mounting boss portions defining mounting apertures 108. The arms 104 of the link 74 preferably are separated from the bolt 90 by a bearing assembly 110, which is similar to the bearing assembly 100. However, other suitable types of bearings may also be used.

A first set of spacers 112 preferably extend between the bearing assemblies 100 and 110 to space the link 74 and seat stays 72 in a desired spaced-apart relationship. Preferably, the spacers 112 are generally annular in shape and include a tapered body such that one end of the spacer 112 has a smaller diameter than the opposite end of the spacer 112. Desirably, each of the spacers 112 only contacts the inner race of each of the bearings 100, 110 so that the outer races of the bearings 100, 110 may freely rotate relative to the inner races and, thus, relative to the bolt 90. Similarly, the head portion 90a of the bolt 90 and the nut 94 are similar configured to contact only the inner races of the bearings 110. The larger diameter end surface of the spacer 112 covers a significant portion of the seal 102 and, preferably, substantially the entire seal 102 to further inhibit foreign material from contaminating the bearing 100.

Preferably, the shock absorber 20 is separated from the mounting bosses 96 of the seat stays 72 by a pair of spacers 120. Desirably, one spacer 120 is provided between each side of the mounting eyelet 80 of the shock absorber 20 and a respective one of the mounting bosses 96 of the seat stays 72. Preferably, the shock absorber 20 is substantially centered between the mounting bosses 96. Thus, each of the spacers 120 desirably has substantially the same dimension along the shaft axis S. However, in other arrangements, the shock absorber 20 may be mounted off-center or may contact another component of the bicycle 10 on one side such that only one spacer 120 is utilized.

Preferably, each of the spacers 120 includes a first portion, or first spacer member 122, and a second portion, or second spacer member 124. Desirably, the spacer members 122 and 124 are moveable relative to one another and, in one arrangement, are separate pieces from one another. Each spacer member 122, 124 preferably is generally annular in shape and surrounds the shaft portion of the bolt 90.

The first spacer member 122 includes a curved contact surface 126. Preferably, the contact surface 126 is protruding, or convex, and spherical in shape. Similarly, the second spacer member 124 includes a curved contact surface 128, which, preferably, is also spherical in shape. The contact surface 128 preferably is recessed, or concave, and configured to substantially mate with the surface 126 of the spacer member 122. Accordingly, with such an arrangement, the spacer members 122 and 124 may be moved relative to one another to various positions along their respective contact surfaces 126, 128. The preferred spherical shape of the surfaces 126 and 128 permits the relative position of the spacer members 122 and 124 to be adjusted in three dimensions.

Opposite the curved surface 126, preferably the spacer member 122 includes a planar end surface 128. Desirably, the planar end surface 128 abuts against a generally planar side surface of the mounting eyelet 80 of the shock absorber 20. Furthermore, preferably the inside diameter of the spacer member 122 is sized relative to the outer diameter of the shaft portion of the bolt 90 such that a clearance space 130 therebetween. Desirably, the outside diameter of the shaft portion of the bolt 90 is sized to create a similar clearance space with the inside diameter of the mounting aperture 82 of the shock absorber. The clearance space 130 permits the spacer members 122, as well as the shock absorber 20, to be movable, or rotatable, relative to an axis that is perpendicular to both the longitudinal axis L of the shock absorber 20 and the shaft axis S of the bolt 90, as is described in greater detail below.

Preferably, the spacer member 124 is tapered from the end incorporating the curved surface 128 toward a planar end surface 132. The planar end surface 132 preferably contacts only the inner race of the bearing 100 so that the outer race may be freely rotatable relative to the inner race and, therefore, the bolt 90. Furthermore, preferably the insider diameter of the aperture of the spacer member 124 preferably is substantially equivalent to an outside diameter of the shaft portion of the bolt 90 such that the spacer member 124 rests upon the shaft portion of the bolt 90 preferably with little or no clearance therebetween.

With such an arrangement, advantageously, the spacer member 122 is located relative to the shock absorber 20 by the contact between the planar surface 128 and the side surface of the mounting eyelet 80. Accordingly, the shock absorber 20 and the spacer member 122 are rotatable together. Similarly, the spacer member 124 is located relative to one or both of the bolt 90 and the bearing 100. Thus, the spacer member 124 is substantially fixed in position relative to the bolt 90. As a result, the shock absorber 20 and spacer member 122 are movable, or rotatable, relative to the bolt 90 and spacer member 124 by relative movement of the spacer members 122 and 124 along their respective contact surfaces 126 and 128.

Ideally, the shock absorber mounting structures of the main frame 16 and sub-frame 18 of the bicycle frame assembly 14 will be perfectly aligned. In such a situation, once the forward end of the shock absorber 20 is connected to the main frame 16 (thus generally positioning the longitudinal axis L of the shock absorber 20 relative to the main frame 16), the bolt 90 and the shock absorber 20 will be positioned relative to one another such that the shaft axis S and the longitudinal axis L of the shock absorber 20 are perpendicular to one another and, thus, define an angle θ of 90 degrees therebetween. However, as noted above, normal variations in the manufacturing process of the various components of the bicycle frame 14 shock absorber 20 and other components of the bicycle 10 may result in the shaft axis S and longitudinal axis L of the shock absorber not being aligned at a angle θ of precisely 90 degrees, or another specifically desired angle.

Without a mechanism for compensation of any actual misalignment between the axes S and L, the shock absorber 20 typically becomes the mechanism for compensation. Specifically, the two slideable portions 20a, 20b of the shock absorber 20 (FIG. 2) tend to become misaligned along the longitudinal axis L. Accordingly, forces applied to the shock absorber by the sub-frame 18 through the bolt 90 are not directed precisely along the longitudinal axis L. As a result, side loads are applied to the shock absorber 20, which may decrease the performance of the shock absorber 20 and reduce the life of various seals between the moving components of the shock absorber 20.

However, utilizing the disclosed arrangement, and other suitable variations thereof, the shock absorber 20 and the pair of spacer members 122 may be rotated to adjust the angle θ to compensate for any such misalignments. The clearance space 130 between the inner diameters of the spacer members 122 and aperture 82 of the shock absorber mounting eyelet 80 facilitate such rotational movement of the shock absorber 20. Desirably, the clearance space 130 has a radial dimension of between about 0.005 and 0.020 inches. Preferably, the clearance space 130 has a radial dimension of between about 0.006 and 0.014 inches and, more preferably, about 0.010 inches. Such a range of radial dimensions is presently contemplated based on typical dimensions of commonly-used bicycle components. However, desirably, the clearance space 130, and/or other components of the system 12, is configured to permit a total adjustment of the angle θ of between about 0.5 and 5 degrees. Preferably, the clearance space 130 is sized to provide a total adjustment of the angle θ of between about 0.5 and 2 degrees and, more preferably, about 1 degree. Such a range of adjustment is typically sufficient to substantially or completely compensate for misalignment occurring due to normal manufacturing variations. However, in other arrangements, a greater degree of angular adjustment may be preferred.

Once the shock absorber 20 is adjusted to a desirable position, the nut 94 may be tightened on the bolt 90 to secure the entire shock mounting assembly 12 in the desired position. Desirably, friction forces developed between the contact surfaces 126 and 128 of the spacer members 122 and 124, respectively, at least substantially fix the shock absorber 20 in a desired rotational position relative to the bolt 90.

It should be noted that the mounting eyelet 80 of the portion 20a (secured to the main frame 16) may be attached with a mechanism capable of permitting the longitudinal axis L of the shock absorber 20 to be somewhat adjustable. However, with such an arrangement, the mounting shaft (e.g., a bolt) is necessarily significantly smaller than the mounting aperture 82 of the shock 20 in order to accommodate the adjustment mechanism, which often is a spherical bushing. Increasing the mounting aperture 82 diameter is undesirable because doing so would increase the eyelet to eyelet distance (overall length) of the shock absorber 20 or, conversely, reduce the available travel of the shock.

Accordingly, one advantage with the present arrangement is that the diameter of the support shaft (e.g., bolt 90) may be enlarged up to a dimension nearly equal to the diameter of the mounting aperture 82, which provides improved strength without increasing the length of the shock absorber 20. Preferably, the mounting aperture 82 is a standard dimension commonly used in the bicycle industry without a wear bushing added. The illustrated mounting arrangement 12 is configured to accommodate approximately 1–2 millimeters of misalignment between the opposing shock mount structures, which is attainable in most manufacturing environments. However, the present arrangement 12 may be adapted to accommodate smaller or larger degrees of misalignment as well.

Although this invention has been disclosed in the context of a certain preferred embodiment and examples, it will be understood by those skilled in the art that the present invention extends beyond the specifically disclosed embodiment to other alternative embodiments and/or uses of the invention and obvious modifications and equivalents thereof. In particular, while the present shock absorber mounting system has been described in the context of a particularly preferred embodiment, the skilled artisan will appreciate, in view of the present disclosure, that certain advantages, features and aspects of the system may be realized in a variety of other applications, many of which have been noted above. For example, it should be noted that although the above-described shock absorber mounting system 12 has been described as providing a connection between the shock absorber 20 and the sub-frame 18, the system 12 may be adapted to provide a connection between the shock absorber 20 and the main frame 16. Furthermore, although the seat stays 72, link 74 and shock absorber 20 are configured to be connected by the bolt 90, the system 12 may be adapted for use in mounting the shock absorber 20 at any suitable location on the bicycle 10 and joining any number of suitable components of the bicycle 10.

Additionally, it is contemplated that various aspects and features of the invention described can be practiced separately, combined together, or substituted for one another, and that a variety of combinations and subcombinations of the features and aspects can be made and still fall within the scope of the invention. Thus, it is intended that the scope of the present invention herein disclosed should not be limited by the particular disclosed embodiment described above, but should be determined only by a fair reading of the claims.

What is claimed is:

1. A bicycle, comprising:
   a frame assembly including a first portion and a second portion movable relative to one another;
   a shock absorber having a first end configured to be secured to said first portion of said frame assembly;

a support shaft defining a shaft axis, said support shaft supported by and substantially fixed relative to said second portion of said frame assembly, said support shaft sized and shaped to be received by a mounting aperture in said second end of said shock absorber; and a first spacer and a second spacer, said first spacer extending along said support shaft between a first side of said shock absorber and said bicycle frame and said second spacer extending along said support shaft between a second side of said shock absorber and said bicycle frame, each of said first and second spacers having a first portion and a second portion, said first portion having a first curved surface and said second portion having a second curved surface complementary to and configured to contact said first curved surface, wherein said first portion is configured to be located relative to said shock absorber and said second portion is configured to be located relative to said support shaft;

wherein said first and second portions are movable relative to one another along said first and second contact surfaces to permit adjustment of said first and second spacers to compensate for misalignment between said longitudinal axis of said shock absorber and said shaft axis.

2. The bicycle of claim 1, wherein said first and second curved surfaces are spherical in shape.

3. The bicycle of claim 1, wherein said first portions of said first and second spacers are generally annular in shape and surround said support shaft, an inner surface of each of said first portions sized to provide a clearance space between said inner surface of said first portion and an outer surface of said support shaft.

4. The bicycle of claim 3, wherein said second portions of each of said first and second spacers is generally annular in shape, an inner surface of each of said second portions are sized and shaped for a close fit on said outer surface of said support shaft.

5. The bicycle of claim 1, wherein an end surface of said first portion is configured to abut a side surface of a mounting eyelet of said shock absorber to locate said first portion relative to said shock absorber.

6. The bicycle of claim 1, additionally comprising at least one bearing assembly interposed between said support shaft and said second portion of said frame assembly.

7. The bicycle of claim 1, wherein said second portion of said frame assembly comprises a sub-frame assembly configured to carry a rear wheel of said bicycle.

8. The bicycle of claim 7, wherein said sub-frame assembly comprises a chain stay member and a link, wherein said chain stay member and said link are supported for rotation about said shaft axis.

9. An apparatus for mounting a shock absorber to a portion of a bicycle frame, comprising:

a support shaft defining a shaft axis, said support shaft sized and shaped to extend through a first aperture in a mounting eyelet of the shock absorber and through a second aperture in the bicycle frame; and at least one spacer extending along said support shaft between the mounting eyelet and the bicycle frame, said at least one spacer having a first portion and a second portion, said first portion having a first curved surface and said second portion having a second curved surface complementary to and configured to contact said first curved surface, wherein said first portion is configured to be located relative to the mounting eyelet and said second portion is configured to be located relative to said support shaft;

wherein said first and second portions are movable relative to one another along said first and second contact surfaces to permit adjustment of said at least one spacer to compensate for misalignment between an axis of said shock absorber and said shaft axis.

10. The apparatus of claim 9, wherein said first and second curved surfaces are spherical in shape.

11. The apparatus of claim 9, wherein said first portion of said spacer is generally annular in shape and surrounds said support shaft, an inner surface of said first portion sized to provide a clearance space between said inner surface of said first portion and an outer surface of said support shaft.

12. The apparatus of claim 9, wherein said second portion of said spacer is generally annular in shape, an inner surface of said second portion being sized and shaped for a close fit on said outer surface of said support shaft.

13. The apparatus of claim 9, wherein an end surface of said first portion is configured to abut a side surface of a mounting eyelet of said shock absorber to locate said first portion relative to said shock absorber.

14. The apparatus of claim 9, wherein said at least one spacer comprises a first spacer and a second spacer configured to be positioned on opposing sides of the mounting eyelet and between spaced portions of the bicycle frame.

15. A method for reducing side loads on a shock absorber mounted between movable portions of a bicycle frame, comprising:

securing a first end of a shock absorber to a first portion of the bicycle frame;

passing a support shaft, defining a shaft axis, through a mounting aperture in a second portion of the bicycle frame and through a mounting eyelet on a second end of the shock absorber, said support shaft supported relative to the second portion of the bicycle frame;

locating a first portion of a spacer relative to the shock absorber;

locating a second portion of said spacer relative to said support shaft such that said first and second portions contact one another along respective curved contact surfaces;

securing said first and second portions of said spacer in a position relative to one another to accommodate misalignment of said shaft axis and said shock axis.

16. The method of claim 15, additionally comprising configuring said curved surfaces to be spherical in shape.

17. The method of claim 15, wherein said locating of said first portion of said spacer comprises positioning an end surface of said first portion against a side surface of the mounting eyelet of said shock absorber.

18. The method of claim 17, wherein said locating of said second portion comprises positioning an annular inner surface of said second portion substantially coaxial to an outer surface of said support shaft.

19. The method of claim 15, wherein said securing of said first end of said shock absorber comprises connecting said first end to a main frame of the bicycle frame.

20. The method of claim 19, wherein said passing of said support shaft through said second portion of the bicycle frame comprises passing said support shaft through apertures in both a link and seat stay member of a sub-frame of the bicycle frame.

* * * * *